(12) United States Patent
Silverbrook

(10) Patent No.: US 7,980,667 B2
(45) Date of Patent: *Jul. 19, 2011

(54) NOZZLE ARRANGEMENT WITH PIVOTAL WALL COUPLED TO THERMAL EXPANSION ACTUATOR

(75) Inventor: Kia Silverbrook, Balmain (AU)

(73) Assignee: Silverbrook Research Pty Ltd, Balmain, New South Wales (AU)

( * ) Notice: Subject to any disclaimer, the term of this patent is extended or adjusted under 35 U.S.C. 154(b) by 0 days.

This patent is subject to a terminal disclaimer.

(21) Appl. No.: 12/536,452

(22) Filed: Aug. 5, 2009

(65) Prior Publication Data

US 2009/0289996 A1 Nov. 26, 2009

Related U.S. Application Data

(63) Continuation of application No. 11/782,591, filed on Jul. 24, 2007, now Pat. No. 7,581,816, which is a continuation of application No. 11/026,125, filed on Jan. 3, 2005, now Pat. No. 7,261,392, which is a continuation of application No. 10/302,605, filed on Nov. 23, 2002, now Pat. No. 6,988,787, which is a continuation of application No. 10/120,345, filed on Apr. 12, 2002, now Pat. No. 6,513,908, which is a continuation-in-part of application No. 09/112,767, filed on Jul. 10, 1998, now Pat. No. 6,416,167.

(30) Foreign Application Priority Data

Jul. 15, 1997 (AU) .................................. PO7991
Mar. 25, 1998 (AU) .................................. PP2592

(51) Int. Cl.
*B41J 2/04* (2006.01)
*B41J 2/05* (2006.01)

(52) U.S. Cl. .......................................... 347/54; 347/67

(58) Field of Classification Search ............... 347/54, 347/67
See application file for complete search history.

(56) References Cited

U.S. PATENT DOCUMENTS 4,423,401 A 12/1983 Mueller
(Continued)

FOREIGN PATENT DOCUMENTS

DE 1648322 A 3/1971
(Continued)

OTHER PUBLICATIONS

Ataka, Manabu et al, "Fabrication and Operation of Polymide Bimorph Actuators for Ciliary Motion System". Journal of Microelectromechanical Systems, US, IEEE Inc. New York, vol. 2, No. 4, Dec. 1, 1993, pp. 146-150, XP000443412, ISSN: 1057-7157.

(Continued)

*Primary Examiner* — Stephen D Meier
*Assistant Examiner* — Geoffrey Mruk

(57) ABSTRACT

A nozzle arrangement for an inkjet printhead includes a substrate assembly defining an ink inlet channel; a nozzle chamber in fluid communication with the ink inlet channel, the nozzle chamber including an ink ejection port defined through a roof of the nozzle chamber, and a pivotal wall formed as part of one sidewall of the nozzle chamber; a paddle attached to the pivotal wall in a cantilevered manner, and extending into the nozzle chamber; a pair of anchors extending from the substrate assembly, a first anchor of the pair connected to a positive electrical contact and a second anchor of the pair connected to a negative electrical contact; and a thermal expansion actuator forming a bridge between the pair of anchors and the pivotal wall, the thermal expansion actuator having two arms each respectively attached to each of the pair of anchors, the thermal expansion actuator further having a bridge portion bridging the two arm. The thermal expansion actuator is configure to expand upon application of a current supplied through the pair of anchors.

4 Claims, 6 Drawing Sheets

U.S. PATENT DOCUMENTS

| | | | |
|---|---|---|---|
| 4,553,393 A | 11/1985 | Ruoff | |
| 4,672,398 A | 6/1987 | Kuwabara et al. | |
| 4,737,802 A | 4/1988 | Mielke | |
| 4,864,824 A | 9/1989 | Gabriel et al. | |
| 5,029,805 A | 7/1991 | Albarda et al. | |
| 5,113,204 A | 5/1992 | Miyazawa et al. | |
| 5,258,774 A | 11/1993 | Rogers | |
| 5,387,314 A | 2/1995 | Baughman et al. | |
| 5,666,141 A | 9/1997 | Matoba et al. | |
| 5,697,144 A | 12/1997 | Mitani et al. | |
| 5,719,604 A | 2/1998 | Inui et al. | |
| 5,828,394 A | 10/1998 | Khuri-Yakub et al. | |
| 6,007,187 A | 12/1999 | Kashino et al. | |
| 6,019,457 A | 2/2000 | Silverbrook | |
| 6,079,821 A | 6/2000 | Chwalek et al. | |
| 6,174,050 B1 | 1/2001 | Kashino et al. | |
| 6,188,415 B1 | 2/2001 | Silverbrook | |
| 6,213,589 B1 | 4/2001 | Silverbrook | |
| 6,214,244 B1 | 4/2001 | Silverbrook | |
| 6,227,654 B1 | 5/2001 | Silverbrook | |
| 6,247,789 B1 | 6/2001 | Sanada | |
| 6,247,790 B1 | 6/2001 | Silverbrook et al. | |
| 6,283,582 B1 | 9/2001 | Silverbrook | |
| 6,299,290 B1 | 10/2001 | Silverbrook | |
| 6,352,337 B1 | 3/2002 | Sharma | |
| 6,371,598 B1 | 4/2002 | Fujii et al. | |
| 6,416,167 B1 | 7/2002 | Silverbrook | |
| 6,513,908 B2 | 2/2003 | Silverbrook | |
| 6,561,627 B2 | 5/2003 | Jarrold et al. | |
| 6,644,786 B1 | 11/2003 | Lebens | |
| 6,669,332 B2 | 12/2003 | Silverbrook | |
| 6,682,174 B2 | 1/2004 | Silverbrook | |
| 6,685,303 B1 | 2/2004 | Trauernicht et al. | |
| 6,866,369 B2 | 3/2005 | Silverbrook | |
| 6,874,866 B2 | 4/2005 | Silverbrook | |
| 6,880,918 B2 | 4/2005 | Silverbrook | |
| 6,886,917 B2 | 5/2005 | Silverbrook et al. | |
| 6,988,787 B2 | 1/2006 | Silverbrook | |
| 7,077,508 B2 | 7/2006 | Silverbrook | |
| 7,134,740 B2 | 11/2006 | Silverbrook | |
| 7,134,745 B2 | 11/2006 | Silverbrook | |
| 7,156,494 B2 | 1/2007 | Silverbrook et al. | |
| 7,156,495 B2 | 1/2007 | Silverbrook et al. | |
| 7,182,436 B2 | 2/2007 | Silverbrook et al. | |
| 7,188,933 B2 | 3/2007 | Silverbrook et al. | |
| 7,195,339 B2 | 3/2007 | Silverbrook | |
| 7,264,335 B2 | 9/2007 | Silverbrook et al. | |
| 7,284,838 B2 | 10/2007 | Silverbrook et al. | |
| 7,287,834 B2 * | 10/2007 | Silverbrook | 347/54 |
| 7,322,679 B2 | 1/2008 | Silverbrook | |
| 7,347,536 B2 | 3/2008 | Silverbrook et al. | |
| 7,364,271 B2 | 4/2008 | Silverbrook | |
| 7,401,902 B2 | 7/2008 | Silverbrook | |
| 7,438,391 B2 | 10/2008 | Silverbrook et al. | |
| 7,465,023 B2 | 12/2008 | Silverbrook | |
| 7,465,029 B2 | 12/2008 | Silverbrook et al. | |
| 7,465,030 B2 | 12/2008 | Silverbrook | |
| 7,467,855 B2 | 12/2008 | Silverbrook | |
| 7,470,003 B2 | 12/2008 | Silverbrook | |
| 7,506,969 B2 | 3/2009 | Silverbrook | |
| 7,517,057 B2 | 4/2009 | Silverbrook | |
| 7,520,594 B2 | 4/2009 | Silverbrook | |
| 7,533,967 B2 | 5/2009 | Silverbrook et al. | |
| 7,537,301 B2 | 5/2009 | Silverbrook | |
| 7,549,731 B2 | 6/2009 | Silverbrook | |
| 7,556,351 B2 | 7/2009 | Silverbrook | |
| 7,556,355 B2 | 7/2009 | Silverbrook | |
| 7,556,356 B1 | 7/2009 | Silverbrook | |
| 7,562,967 B2 | 7/2009 | Silverbrook et al. | |
| 7,566,114 B2 | 7/2009 | Silverbrook | |
| 7,568,790 B2 | 8/2009 | Silverbrook et al. | |
| 7,568,791 B2 | 8/2009 | Silverbrook | |
| 7,604,323 B2 | 10/2009 | Silverbrook et al. | |
| 7,611,227 B2 | 11/2009 | Silverbrook | |
| 7,628,471 B2 | 12/2009 | Silverbrook | |
| 7,637,594 B2 | 12/2009 | Silverbrook et al. | |
| 7,641,314 B2 | 1/2010 | Silverbrook | |
| 7,641,315 B2 | 1/2010 | Silverbrook | |
| 7,669,973 B2 | 3/2010 | Silverbrook et al. | |
| 7,758,161 B2 | 7/2010 | Silverbrook et al. | |
| 7,780,269 B2 | 8/2010 | Silverbrook | |
| 7,802,871 B2 | 9/2010 | Silverbrook | |
| 2002/0149665 A1 | 10/2002 | Steinblatt | |
| 2003/0103109 A1 | 6/2003 | Silverbrook | |
| 2003/0202055 A1 | 10/2003 | Jeanmaire et al. | |

FOREIGN PATENT DOCUMENTS

| | | | |
|---|---|---|---|
| DE | 2905063 | | 8/1980 |
| DE | 3245283 | A | 6/1984 |
| DE | 3430155 | A | 2/1986 |
| DE | 3716996 | A | 12/1988 |
| DE | 3934280 | A | 4/1990 |
| DE | 4328433 | A | 3/1995 |
| DE | 19516997 | A | 11/1995 |
| DE | 19517969 | A | 11/1995 |
| DE | 19532913 | A | 3/1996 |
| DE | 19623620 | A1 | 12/1996 |
| DE | 19639717 | A | 4/1997 |
| EP | 0092229 | A | 10/1983 |
| EP | 0398031 | A | 11/1990 |
| EP | 0427291 | A | 5/1991 |
| EP | 0431338 | A | 6/1991 |
| EP | 0478956 | | 4/1992 |
| EP | 0506232 | A | 9/1992 |
| EP | 0510648 | A | 10/1992 |
| EP | 0627314 | A | 12/1994 |
| EP | 0634273 | A2 | 1/1995 |
| EP | 0713774 | A2 | 5/1996 |
| EP | 0737580 | A | 10/1996 |
| EP | 0750993 | A | 1/1997 |
| EP | 0882590 | A | 12/1998 |
| FR | 2231076 | | 12/1974 |
| GB | 792145 | | 3/1958 |
| GB | 1428239 | A | 3/1976 |
| GB | 2262152 | A | 6/1993 |
| JP | 58-112747 | A | 7/1983 |
| JP | 58-116165 | A | 7/1983 |
| JP | 61-025849 | A | 2/1986 |
| JP | 61-268453 | A | 11/1986 |
| JP | 62-94347 | * | 4/1987 |
| JP | 01-105746 | A | 4/1989 |
| JP | 01-115639 | A | 5/1989 |
| JP | 01-128839 | A | 5/1989 |
| JP | 01-257058 | A | 10/1989 |
| JP | 01-306254 | A | 12/1989 |
| JP | 02-050841 | A | 2/1990 |
| JP | 02-092643 | A | 4/1990 |
| JP | 02-108544 | A | 4/1990 |
| JP | 02-158348 | A | 6/1990 |
| JP | 02-162049 | A | 6/1990 |
| JP | 02-265752 | A | 10/1990 |
| JP | 03-065348 | A | 3/1991 |
| JP | 03-112662 | A | 5/1991 |
| JP | 03-180350 | A | 8/1991 |
| JP | 04-001051 | A | 1/1992 |
| JP | 04-118241 | A | 4/1992 |
| JP | 04-126255 | A | 4/1992 |
| JP | 04-141429 | A | 5/1992 |
| JP | 04-353458 | A | 12/1992 |
| JP | 04-368851 | A | 12/1992 |
| JP | 05-284765 | A | 10/1993 |
| JP | 05-318724 | A | 12/1993 |
| JP | 06-091865 | A | 4/1994 |
| JP | 06-091866 | A | 4/1994 |
| JP | 07-314665 | A | 12/1995 |
| JP | 09-314915 | A | 12/1997 |
| JP | 2000-293335 | A | 10/2000 |
| WO | WO 94/18010 | A | 8/1994 |
| WO | WO 97/12689 | A | 4/1997 |
| WO | WO 00/48938 | A1 | 8/2000 |
| WO | WO 01/89840 | A1 | 11/2001 |

OTHER PUBLICATIONS

Noworolski J M et al: "Process for in-plane and out-of-plane single-crystal-silicon thermal microactuators" Sensors And Actuators A, Ch. Elsevier Sequoia S.A., Lausane, vol. 55. No. 1, Jul. 15, 1996, pp. 65-69, XP004077979.

Yamagata, Yutaka et al, "A Micro Mobile Mechanism Using Thermal Expansion and its Theoretical Analysis". Proceedings of the workshop on micro electro mechanical systems (MEMS), US, New York, IEEE, vol. Workshop 7, Jan. 25, 1994, pp. 142-147, XP000528408, ISBN: 0-7803-1834-X.

* cited by examiner

NOZZLE ARRANGEMENT WITH PIVOTAL WALL COUPLED TO THERMAL EXPANSION ACTUATOR

CROSS REFERENCE TO RELATED APPLICATIONS

This is a Continuation of U.S. application Ser. No. 11/782,591 filed Jul. 24, 2007, now issued U.S. Pat. No. 7,581,816, which is a Continuation of U.S. application Ser. No. 11/026,125 filed Jan. 3, 2005, now issued Pat. No. 7,261,392, which is a Continuation of U.S. application Ser. No.10/302,605 filed Nov. 23, 2002, now issued Pat. No. 6,988,787, which is a continuation of U.S. application Ser. No. 10/120,345 filed Apr. 12, 2002, now issued Pat. No. 6,513,908, which is a Continuation-In-Part of U.S. application Ser. No. 09/112,767 filed Jul. 10, 1998, now issued Pat. No. 6,416,167 all of which are herein incorporated by reference.

FIELD OF THE INVENTION

This invention relates to a printhead chip for an inkjet printhead. More particularly, this invention relates to a printhead chip for an inkjet printhead that incorporates pusher actuation in order to achieve ink drop ejection.

BACKGROUND OF THE INVENTION

As set out in the above referenced applications/patents, the Applicant has spent a substantial amount of time and effort in developing printheads that incorporate micro electro-mechanical system (MEMS)—based components to achieve the ejection of ink necessary for printing.

As a result of the Applicant's research and development, the Applicant has been able to develop printheads having one or more printhead chips that together incorporate up to 84 000 nozzle arrangements. The Applicant has also developed suitable processor technology that is capable of controlling operation of such printheads. In particular, the processor technology and the printheads are capable of cooperating to generate resolutions of 1600 dpi and higher in some cases. Examples of suitable processor technology are provided in the above referenced patent applications/patents.

Common to most of the printhead chips that the Applicant has developed is a component that moves with respect to a substrate to eject ink from a nozzle chamber. This component can be in the form of an ink-ejecting member that is displaceable in a nozzle chamber to eject the ink from the nozzle chamber.

As is also clear from the above applications, Applicant has developed a number of ways in which to achieve the ejection of ink from the respective nozzle chambers. A majority of these are based on the selection of a material having a coefficient of thermal expansion that is such that, on a MEMS scale, expansion upon heating and subsequent contraction upon cooling can be harnessed to perform work. The material is formed to define at least part of a thermal actuator that includes a heating circuit. The heating circuit is shaped to be resistively heated when a current passes through the circuit. The current is supplied to the circuit in the form of pulses at a frequency that depends on the printing requirements. The pulses are usually supplied from a CMOS layer positioned on a substrate of the printhead chip. The pulses are shaped and have a magnitude that is also dependent on the printing requirements. The generation and control of the pulses is by way of a suitable microprocessor of the type described in the above referenced applications.

On a macroscopic scale, it is counter-intuitive to use the expansion and subsequent contraction of material in order to achieve the performance of work. Applicant submits that the perceived slow rate of expansion and contraction would lead a person of ordinary skill in the field of macroscopic engineering to seek alternative energy sources.

On a MEMS scale, however, Applicant has found that expansion and contraction of such a material can be harnessed to perform work. The reason for this is that, on this scale, expansion and contraction are relatively rapid and can transmit relatively high force.

There remains an issue of range of movement. While the expansion and contraction are both rapid and forceful, Applicant has found that it would be desirable for a mechanism to be provided whereby such rapidity and force of movement could be amplified at a region where the work is required to eject the ink.

A majority of the nozzle arrangements covered by the above applications and patents use differential expansion in the thermal actuator to achieve bending of the thermal actuator. This bending movement is transmitted to an ink-ejecting component that is either rectilinearly or angularly displaced to eject the ink.

Applicant has found that it would be desirable for simple rectilinear expansion of a thermal actuator to be transmitted to an ink-ejecting component, since such simple rectilinear expansion on a MEMS scale is relatively efficient.

The Applicant has conceived this invention in order to achieve the desired transmission and amplification of motion mentioned above.

SUMMARY OF THE INVENTION

According to an aspect of the present disclosure, a nozzle arrangement for an inkjet printhead comprises a substrate assembly defining an ink inlet channel; a nozzle chamber in fluid communication with the ink inlet channel, the nozzle chamber including an ink ejection port defined through a roof of the nozzle chamber, and a pivotal wall formed as part of one sidewall of the nozzle chamber; a paddle attached to the pivotal wall in a cantilevered manner, and extending into the nozzle chamber; a pair of anchors extending from the substrate assembly, a first anchor of the pair connected to a positive electrical contact and a second anchor of the pair connected to a negative electrical contact; and a thermal expansion actuator forming a bridge between the pair of anchors and the pivotal wall, the thermal expansion actuator having two arms each respectively attached to each of the pair of anchors, the thermal expansion actuator further having a bridge portion bridging the two arm. The thermal expansion actuator is configure to expand upon application of a current supplied through the pair of anchors.

DETAILED DESCRIPTION OF THE INVENTION

Figure 1:
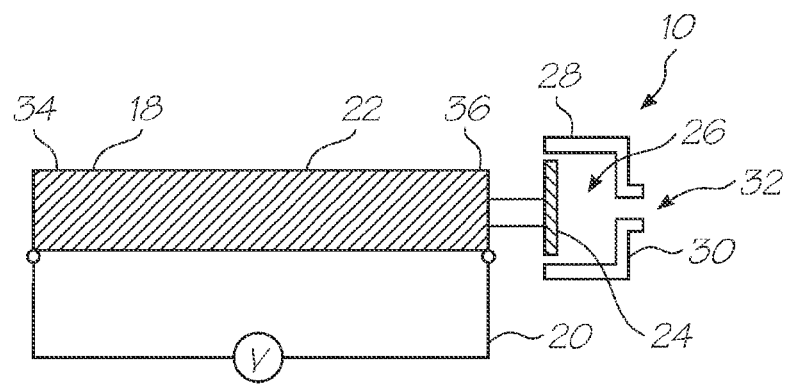
FIG. 1 shows a schematic view of a nozzle arrangement of a first embodiment of a printhead chip, in accordance with the invention, for an inkjet printhead.

In FIG. 1, reference numeral 10 generally indicates a nozzle arrangement for a first embodiment of an ink jet printhead chip, in accordance with the invention.

Figure 6:
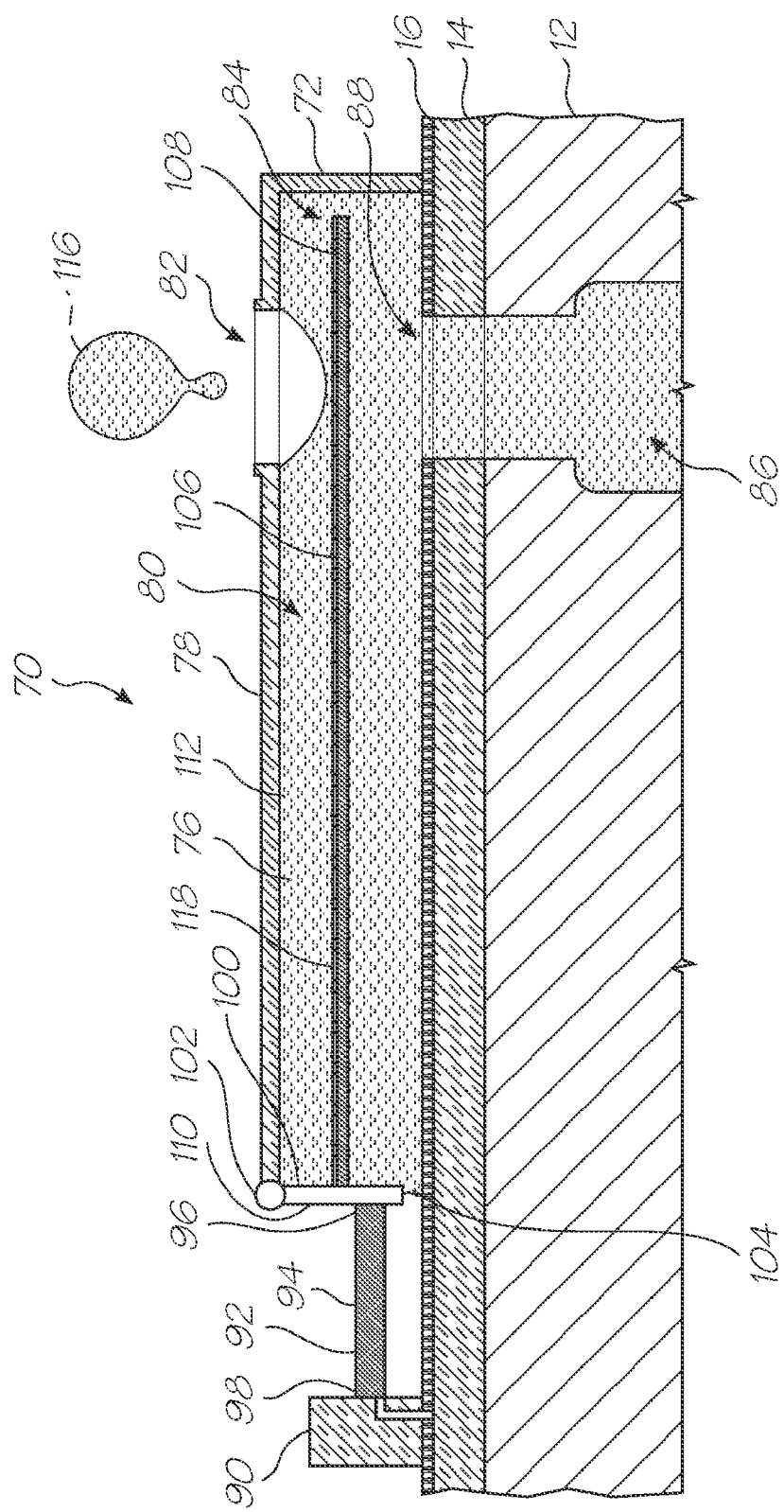
FIG. 6 shows a schematic side view showing further detail of the nozzle arrangement of FIG. 5 in a quiescent condition.
Figure 7:
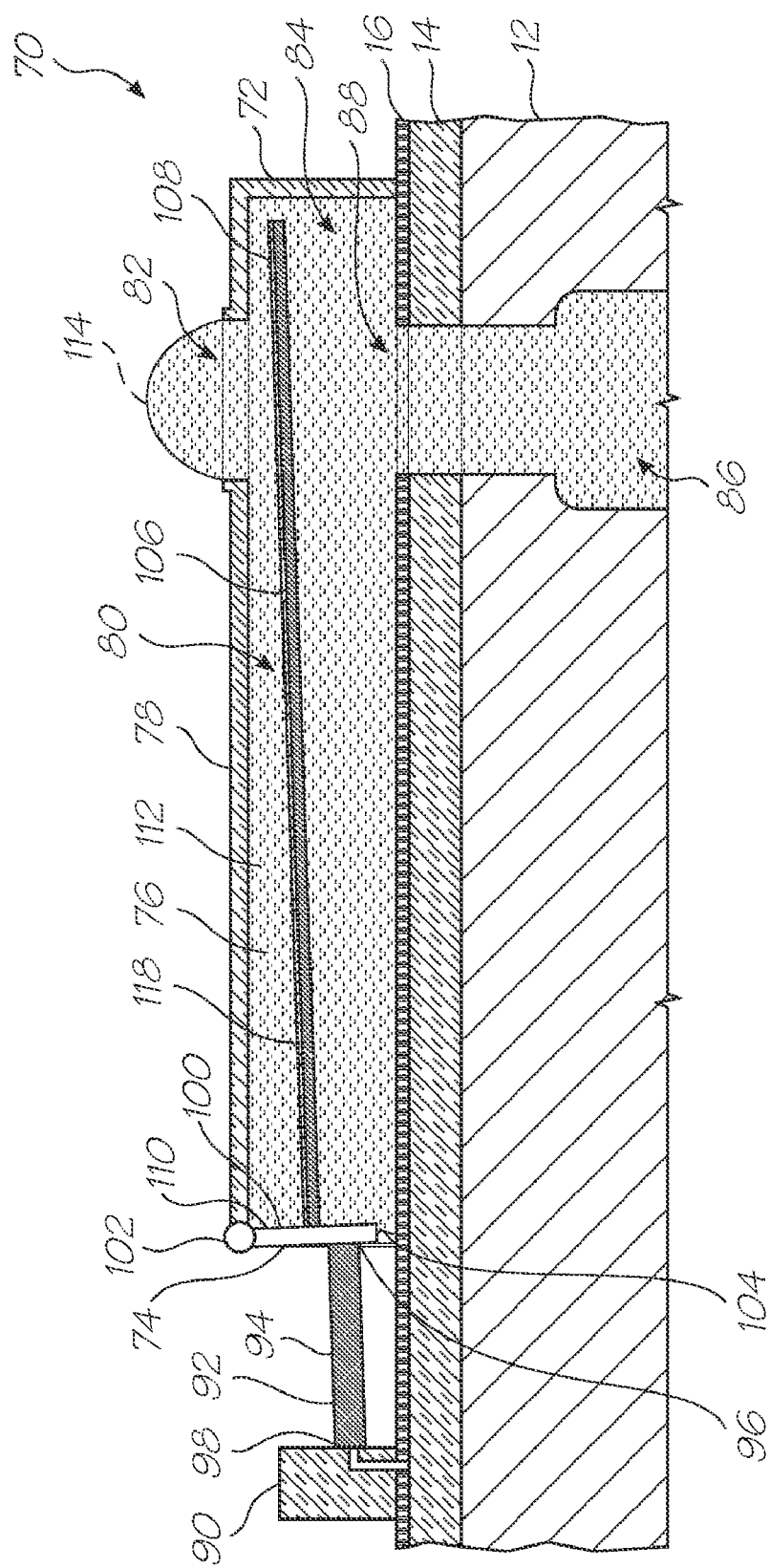
FIG. 7 shows a schematic side view of the nozzle arrangement of FIG. 5 in an operative condition.
Figure 8:
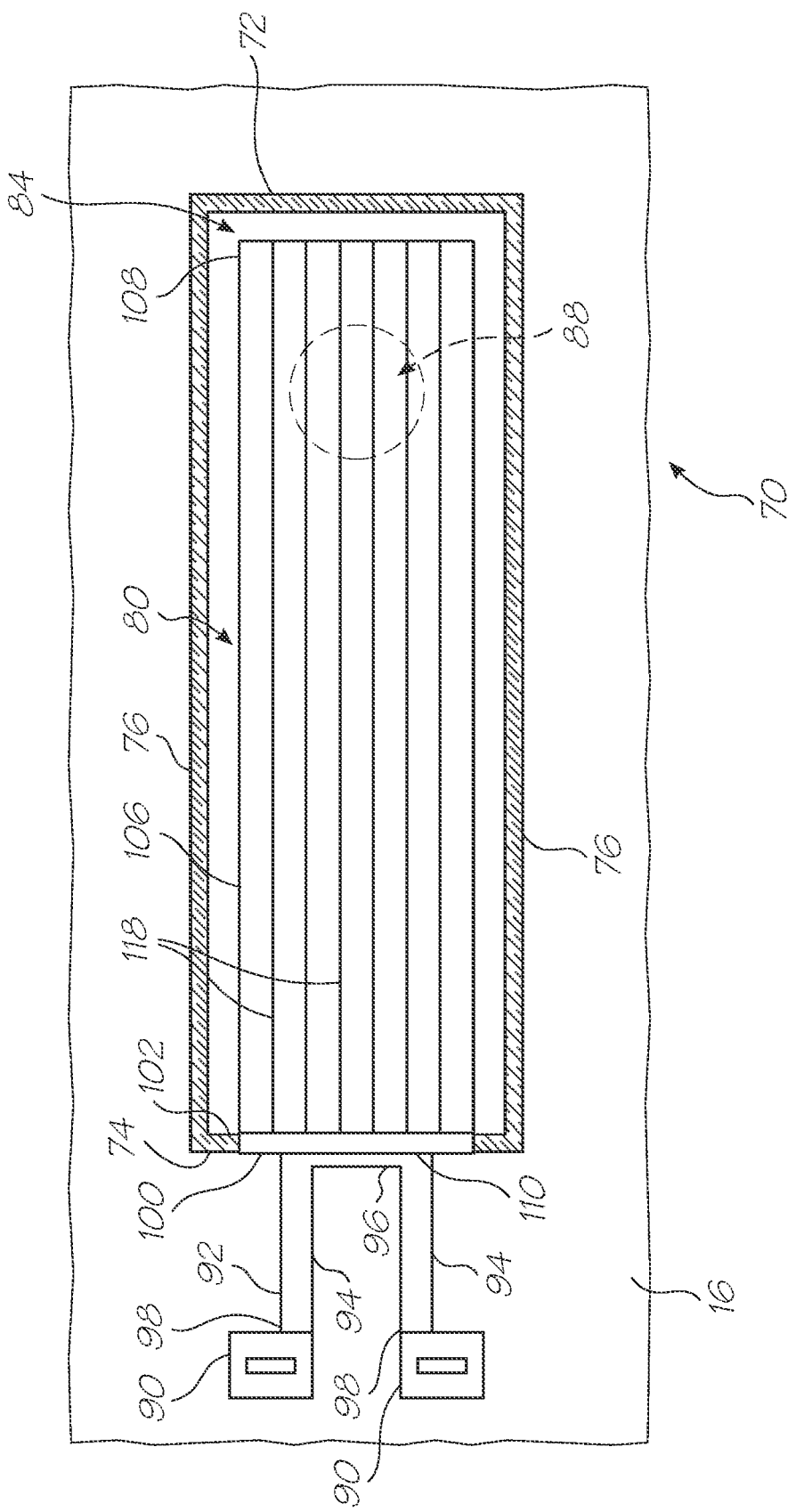
FIG. 8 shows a schematic plan view of the nozzle arrangement of FIG. 5.

The nozzle arrangement 10 is one of a plurality of such nozzle arrangements formed on a silicon wafer substrate 12 (FIG. 6) to define the printhead chip of the invention. As set out in the background of this specification, a single printhead can contain up to 84 000 such nozzle arrangements. For the purposes of clarity and ease of description, only one nozzle arrangement is described. It is to be appreciated that a person of ordinary skill in the field can readily obtain the printhead chip by simply replicating the nozzle arrangement 10 on the wafer substrate 12.

The printhead chip is the product of an integrated circuit fabrication technique. In particular, each nozzle arrangement 10 is the product of a MEMS—based fabrication technique. As is known, such a fabrication technique involves the deposition of functional layers and sacrificial layers of integrated circuit materials. The functional layers are etched to define various moving components and the sacrificial layers are etched away to release the components. As is known, such fabrication techniques generally involve the replication of a large number of similar components on a single wafer that is subsequently diced to separate the various components from each other. This reinforces the submission that a person of ordinary skill in the field can readily obtain the printhead chip of this invention by replicating the nozzle arrangement 10.

An electrical drive circuitry layer 14 is positioned on the silicon wafer substrate 12. The electrical drive circuitry layer 14 includes CMOS drive circuitry. The particular configuration of the CMOS drive circuitry is not important to this description and has therefore been shown schematically in the drawings. Suffice to say that it is connected to a suitable microprocessor and provides electrical current to the nozzle arrangement 10 upon receipt of an enabling signal from said suitable microprocessor. An example of a suitable microprocessor is described in the above referenced patents/patent applications. It follows that this level of detail will not be set out in this specification.

An ink passivation layer 16 is positioned on the drive circuitry layer 14. The ink passivation layer 16 can be of any suitable material, such as silicon nitride.

The nozzle arrangement 10 is shown in FIG. 1 as broadly conceptual. The nozzle arrangement 10 includes an actuator in the form of an electro thermal actuator 18. The actuator 18 includes an electrical resistive heating circuit 20. The circuit 20 incorporates a working member in the form of a conductive heating element 22. The heating element 22 is of a material having a coefficient of thermal expansion that is such that when the material is heated and subsequently cooled, the material is capable of expansion and subsequent contraction to an extent sufficient to perform work on a MEMS—scale. Any of a number of materials used in integrated circuit fabrication could be suitable. Such materials could include gold, copper or titanium. The Applicant has found that titanium aluminum nitride (TiAlN) is particularly suitable for this purpose.

Thermal expansion and contraction occurs per unit length of the heating element 22 as is known. The principle behind the nozzle arrangement 10 is to provide the heating element 22 with sufficient length so that the extent of movement when the heating element 22 expands and contracts is sufficient to generate useful energy. Thus, the length of the heating element 22 is a factor that defines a useful energy transmitting means. In particular, the heating element 22 is of a length which is such that the extent of movement is similar to the extent of movement of the components of the nozzle arrangements described in the above referenced patents/patent applications.

The heating element 22 is connected to an ink-ejecting mechanism in the form of an ink-ejecting member or piston 24. The piston 24 is positioned in a nozzle chamber structure 26. The nozzle chamber structure 26 has nozzle chamber walls 28 and a roof 30. The roof 30 defines an ink ejection port 32.

The heating element 22 has a fixed end 34 and a working end 36 so that, on expansion and contraction of the heating element 22, the working end 36 is displaceable, in a rectilinear manner, with respect to the fixed end 34. This results in reciprocal movement of the piston 24 relative to the roof 30 and subsequent ejection of ink from the ink ejection port 32.

Figure 2:
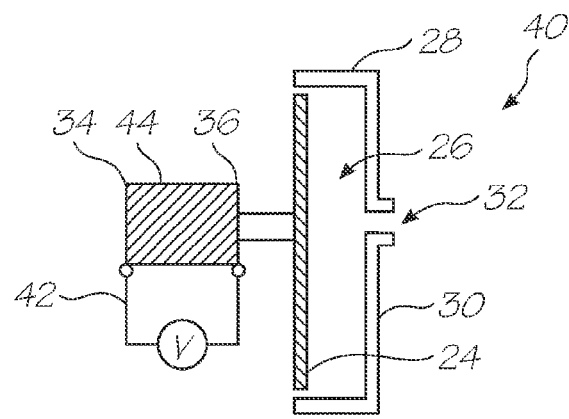
FIG. 2 shows a schematic view of a nozzle arrangement of a second embodiment of a printhead chip, in accordance with the invention, for an inkjet printhead.

In FIG. 2, reference numeral 40 generally indicates a nozzle arrangement of a second embodiment of a printhead chip, in accordance with the invention, for an inkjet printhead. With reference to FIG. 1, like reference numerals refer to like parts, unless otherwise specified.

Again the nozzle arrangement 40 is shown only conceptually. It is respectfully submitted that a person of ordinary skill in the field of MEMS fabrication could readily fabricate a nozzle arrangement that utilizes the concept illustrated in FIG. 2.

The nozzle arrangement 40 also includes a heating circuit 42. However, a heating element 44 of the heating circuit 42 is a convenient length. The nozzle arrangement 40 utilizes a hydraulic principle in order to achieve a useful force transmitting means. In this embodiment, a cross sectional area of the piston 24 and thus the nozzle chamber 26 are a sufficiently high number of orders of magnitude larger than a cross sectional area of the ink ejection port 32. Thus, a required extent of movement of the piston 24 can be reduced considerably from what would usually be required in the nozzle arrangements described in the above referenced applications, while still achieving drop ejection.

Figure 3:
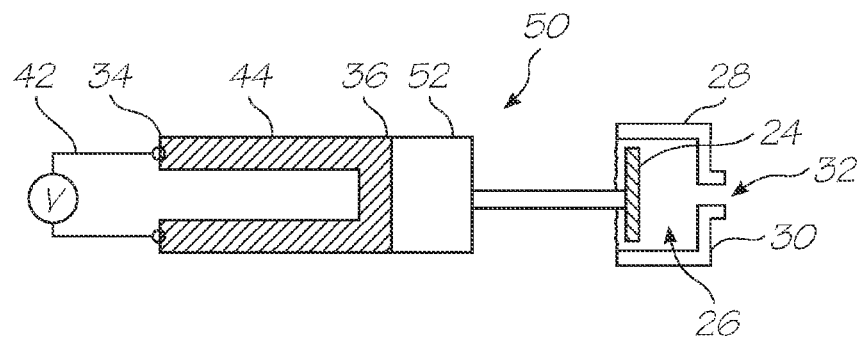
FIG. 3 shows a schematic view of a nozzle arrangement of a third embodiment of a printhead chip, in accordance with the invention.

In FIG. 3, reference numeral 50 generally indicates a nozzle arrangement of a third embodiment of a printhead chip, in accordance with the invention, for an inkjet printhead. With reference to FIGS. 1 and 2, like reference numerals refer to like parts, unless otherwise specified.

The nozzle arrangement 50 is again shown as broadly conceptual. In particular, the nozzle arrangement 50 illustrates that instead of having the dimensional configurations described in the previous embodiment, a suitable motion amplifying means 52 can be positioned between the heating element 44 and the piston 24. The motion amplifying means 52 can take a number of different forms. In particular, the motion amplifying means can be in the form of a conventional micro mechanical arrangement such as a gearing system.

Figure 4:
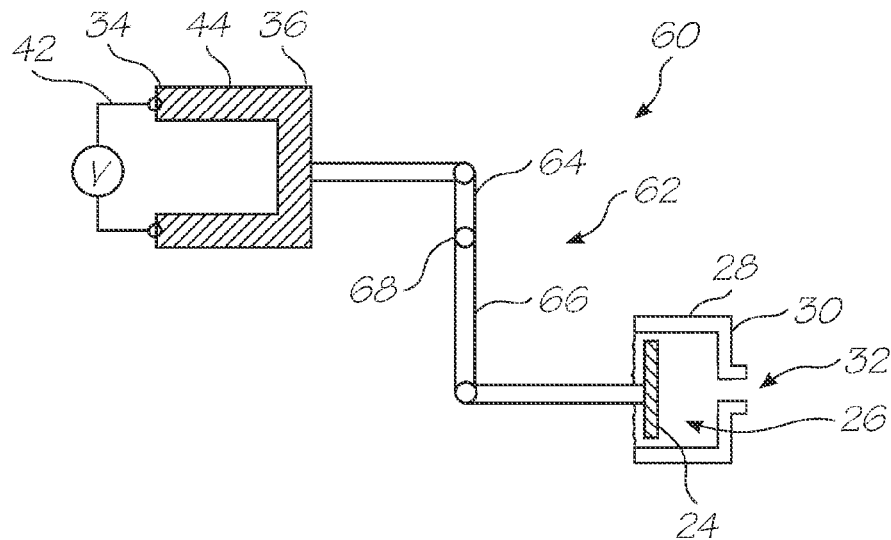
FIG. 4 shows a schematic view of a nozzle arrangement of a fourth embodiment of a printhead chip, in accordance with the invention.
Figure 5:
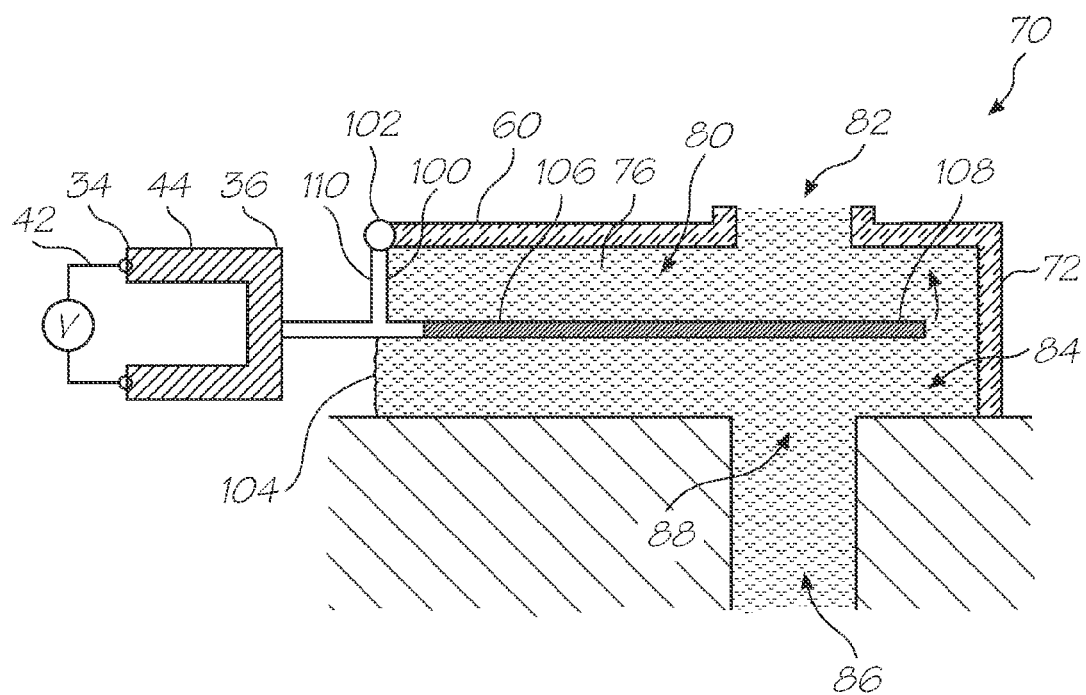
FIG. 5 shows a schematic view of a nozzle arrangement of a fifth embodiment of a printhead chip, in accordance with the invention.

In FIG. 4, reference numeral 60 generally indicates a nozzle arrangement of a fourth embodiment of a printhead chip, in accordance with the invention, for an inkjet printhead. With reference to FIGS. 1 to 3, like reference numerals refer to like parts, unless otherwise specified.

The nozzle arrangement 60 is shown as broadly conceptual. In this embodiment, a lever mechanism 62 is positioned intermediate the working end 36 of the heating element 44 and the piston 24. The lever mechanism 62 has an effective effort arm 64 connected to an effective load arm 66 with a fulcrum 68. It is to be noted that the lever mechanism 62 shown in FIG. 4 is schematic and that any of a number of micro mechanical systems defining lever mechanisms 62 can be used.

The lever mechanism 62 is configured so that the effective load arm 66 is between approximately 20 and 60 times longer than the effective effort arm 64. In particular, the lever mechanism 62 is configured so that the effective load arm 66 is approximately 40 times longer than the effective effort arm 64.

In FIGS. 5 to 8, reference numeral 70 generally indicates a nozzle arrangement of a fifth embodiment of a printhead chip, in accordance with the invention, for an inkjet printhead. With reference to FIGS. 1 to 4, like reference numerals refer to like parts, unless otherwise specified.

The nozzle arrangement 70 includes nozzle chamber walls in the form of a distal end wall 72, a proximal end wall 74 and a pair of opposed sidewalls 76. A roof 78 spans the walls 72, 74, 76. The roof 78 and the walls 72, 74, 76 define a nozzle chamber 80. The roof 78 defines an ink ejection port 82 in fluid communication with the nozzle chamber 80. The walls 72, 74, 76 and the roof 78 are dimensioned so that the nozzle chamber 80 has a rectangular shape when viewed in plan. The ink ejection port 82 is positioned adjacent a distal end 84 of the nozzle chamber 80.

A plurality of ink inlet channels 86 is defined through the substrate 12 and the layers 14, 16. Each ink inlet channel 86 is in fluid communication with a respective nozzle chamber 80. Further, an opening 88 of each ink inlet channel 86 is aligned with the ink ejection port 82 of its associated nozzle chamber 80.

An anchor formation in the form of a pair of anchors 90 is fast with the substrate 12 on a proximal side of the nozzle chamber 80. The heating circuit 44 includes an electro thermal expansion actuator 92 that is fast with the anchors 90 and extends towards the proximal end wall 74. The thermal expansion actuator 92 is of a conductive material and is shaped to define part of the heating circuit 44. The actuator 92 is of a material that has a coefficient of thermal expansion that is such that, when heated and subsequently cooled, expansion and contraction of the material can be harnessed to perform work on a MEMS scale. An example of a suitable material is TiAlN. In particular, the thermal expansion actuator 92 has a pair of arms 94 that are interconnected by a bridge portion 96. The actuator 92 has a fixed portion defined by fixed ends 98 of the arms 94 that are fast with respective anchors 90.

Each of the anchors 90 are configured to provide electrical connection between the fixed ends 98 and the electrical drive circuitry layer 14. In particular, the anchors 90 are configured to provide electrical connection between one fixed end 98 and a negative contact and the other fixed end 98 and a positive contact. The electrical drive circuitry layer 14 is connected to a microprocessor of the type described in the above referenced patents/applications so that electrical current pulses of suitable shape and magnitude can be supplied to the actuator 92.

The bridge portion 96 of the actuator 92 defines a working portion of the actuator 92.

The nozzle arrangement 70 includes a pivot member 100 that is pivotally arranged on the proximal end wall 74. The bridge portion 96 of the actuator 92 is connected to the pivot member 100 at a position intermediate a pivot point, indicated at 102, defined by the pivot member 100 and the proximal end wall 74. It is to be understood that the pivot point 102 can be defined by any number of configurations of the pivot member 100 and the proximal end wall 74. For this reason, the pivot point 102 is indicated schematically only. In one possible embodiment, the proximal end wall 74 could define the pivot member 100. In this case, the pivot point 102 would be defined between the proximal end wall 74 and the sidewalls 76. In particular, this would entail hingedly connecting the proximal end wall 74 to the sidewalls 76.

It will be appreciated that, in any event, the pivot member 100 is to form part of the proximal end wall 74. Thus, a sealing member 104 is provided intermediate the pivot member 100 and the ink passivation layer 16. The sealing member 104 is configured to accommodate pivotal movement of the pivot member 100 upon expansion and subsequent contraction of the thermal expansion actuator 92.

The nozzle arrangement 70 includes an ink ejection member in the form of a paddle 106. The paddle 106 is dimensioned to correspond generally with the nozzle chamber 80. In particular, the paddle 106 is dimensioned so that an end portion 108 of the paddle 106 is positioned intermediate the ink ejection port 82 and the opening 88 of the ink inlet channel 86.

The paddle 106 and the pivot member 100 are configured so that the paddle 106 is between approximately 20 and 60 times longer than an effective lever arm, indicated at 110, defined by the paddle 106 and the pivot member 100. In particular, the paddle 106 can be approximately 40 times longer than the effective lever arm 110. It should be noted that the lever arm 110 is only shown schematically because of the wide variety of different possible configurations available for defining the lever arm 110. Further, a ratio of paddle length to lever arm length can vary widely from the 40:1 ratio. This could depend on a number of factors such as driving signal strength and actuator material. For example, in one embodiment, the Applicant has devised the actuator 92 to expand by 50 nanometers while the end portion 108 of the paddle 106 moves through between 1 and 2 microns.

It will be appreciated that a maximum extent of movement of the paddle 106 takes place at the end portion 108 of the paddle 106. Furthermore, this extent of movement is up to 40 times greater than a range of movement of the effective lever arm 110. It follows that the expansion of the thermal actuator 92 is substantially amplified at the end portion 108, therefore facilitating the ejection of ink 112 from the ink ejection port 82 as indicated at 114 in FIG. 7. When the actuator 92 cools, subsequent contraction of the actuator 92 causes an amplified extent of movement of the end portion 108 back into a quiescent position shown in FIG. 6. This results in separation of the ink 114 from the ink 112 to form an ink drop 116.

The paddle 106 includes reinforcing ribs 118 to strengthen the paddle 106. This is necessary due to the relative length of the paddle 106 and a resultant bending moment exerted on the paddle 106.

It will be appreciated that, in light of the above referenced applications and patents, the nozzle arrangement 70 is suited for fabrication with an integrated circuit fabrication technique. Furthermore, the pivot member 100 and pivot point 102 can be defined by any number of micro mechanical arrangements. For example, a flexible member may be formed intermediate the pivot member 100 and the sidewalls 76 or proximal end wall 74 that is distorted to accommodate pivotal movement of the pivot member 100.

Figure 9:
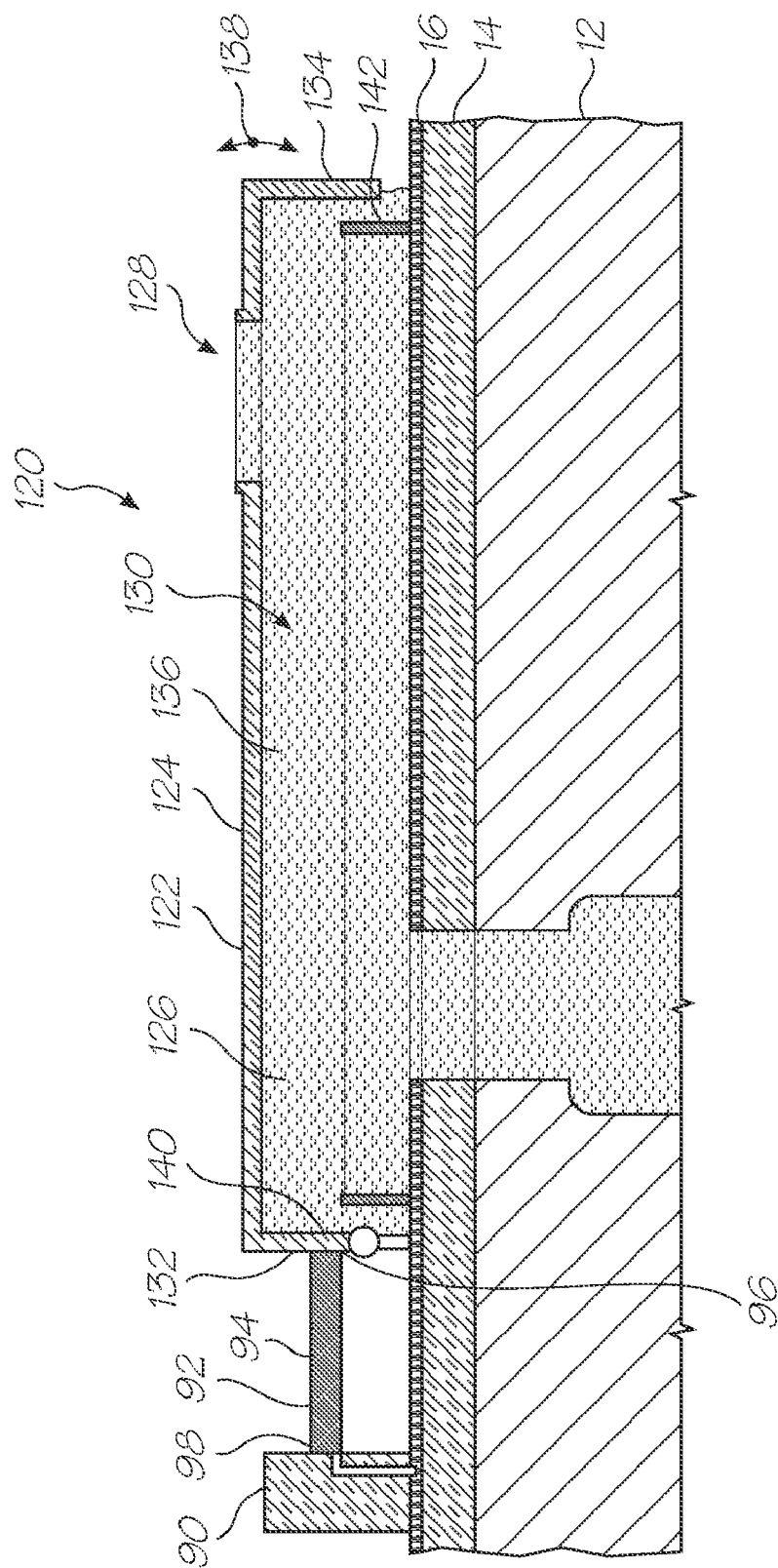
FIG. 9 shows a schematic side view of a nozzle arrangement of a sixth embodiment of a printhead chip, in accordance with the invention, for an inkjet printhead.

In FIG. 9, reference numeral 120 generally indicates a nozzle arrangement of a sixth embodiment of a printhead chip, in accordance with the invention, for an inkjet printhead. With reference to FIGS. 1 to 8, like reference numerals refer to like parts, unless otherwise specified.

The nozzle arrangement 120 includes a nozzle chamber structure in the form of an active ink-ejecting structure 122. The active ink-ejecting structure 122 has a roof 124 and walls 126 that extend from the roof 124 towards the substrate 12. The roof 124 defines an ink ejection port 128. The roof 124 and the walls 126 together define a nozzle chamber 130.

The walls 126 comprise a proximal end wall 132, an opposed distal end wall 134 and a pair of opposed sidewalls 136. The ink ejection port 128 is positioned adjacent the distal end wall 134, while the opening 88 of the ink inlet channel 86 is positioned adjacent the proximal end wall 132.

The proximal end wall 132 is pivotally mounted on the substrate 12 so that the active ink-ejecting structure 122 is pivotal with respect to the substrate 12. In particular, the active ink-ejecting structure 122 is pivotal in the direction of an arrow 138 to an extent that is sufficient to facilitate the ejection of ink from the ink ejection port 128.

The roof 124 and the walls 126 are dimensioned so that the nozzle chamber 130 is rectangular and has a length that is more than 3 times a height of the nozzle chamber 130. This, together with the fact that the ink ejection port 128 and the opening 88 are positioned at opposite ends of the nozzle chamber 130 facilitates the retardation of ink flow from the ink ejection port 128 towards the opening 88 when the structure 122 is pivotally displaced towards the substrate 12. This flow is referred to as backflow and is highly undesirable.

The bridge portion 96 of the actuator 92 is fixed to the proximal end wall 132. Thus, on heating and subsequent expansion of the actuator 92 in the manner described above, the ink-ejecting structure 122 is pivoted towards the substrate 12. Upon cooling and subsequent contraction of the actuator 92 in the manner described above, the ink-ejecting structure 122 is pivoted away from the substrate 12. This reciprocal movement of the ink-ejecting structure 122 results in the ejection of an ink drop from the ink ejection port 128.

The bridge portion 96 is connected to the proximal end wall 132 at a position in which a length of the ink-ejecting structure 122 is up to 40 times greater than a length of an effective lever arm, indicated at 140. It follows that pivotal movement of the effective lever arm 140 as a result of displacement of the bridge portion 96 upon heating and subsequent cooling of the actuator 92 can be amplified by a factor as high as 40. It has been found by the Applicant that this facilitates efficient ink drop ejection.

The nozzle arrangement 120 includes a sealing structure 142 that extends from the ink passivation layer 16. The walls 126 overlap the sealing structure 142 so that a fluidic seal is defined between the sealing structure 142 and the walls 126 when the nozzle chamber 130 is filled with ink.

Applicant believes that this invention provides a means whereby simple thermal expansion and contraction, in a rectilinear manner, can be converted into useful work.

I claim:

1. A nozzle arrangement for an inkjet printhead, the nozzle arrangement comprising:
    a substrate assembly defining an ink inlet channel;
    a nozzle chamber in fluid communication with the ink inlet channel, the nozzle chamber including an ink ejection port defined through a roof of the nozzle chamber, and a pivotal wall formed as part of one sidewall of the nozzle chamber;
    a paddle attached to the pivotal wall in a cantilevered manner, and extending into the nozzle chamber;
    a pair of anchors extending from the substrate assembly, a first anchor of the pair connected to a positive electrical contact and a second anchor of the pair connected to a negative electrical contact; and
    a thermal expansion actuator forming a bridge between the pair of anchors and the pivotal wall, the thermal expansion actuator having two arms each respectively attached to each of the pair of anchors, the thermal expansion actuator further having a bridge portion bridging the two arm, wherein
    the thermal expansion actuator is configure to expand upon application of a current supplied through the pair of anchors.

2. A nozzle arrangement as claimed in claim 1, wherein said ink inlet channel is aligned with said ink ejection port.

3. A nozzle arrangement as claimed in claim 1, wherein the thermal expansion actuator is formed of an electrically conductive material.

4. A nozzle arrangement as claimed in claim 1, wherein the pivotal wall terminates in a sealing member configured to accommodate pivotal movement of the wall whilst impeding ink leakage from the nozzle chamber.

* * * * *